US009298744B2

(12) United States Patent
Pathak et al.

(10) Patent No.: US 9,298,744 B2
(45) Date of Patent: Mar. 29, 2016

(54) METHOD AND APPARATUS FOR ORDERING IMAGES IN AN IMAGE SET BASED ON SOCIAL INTERACTIONS AND VIEWER PREFERENCES

(71) Applicant: Adobe Systems Incorporated, San Jose, CA (US)

(72) Inventors: Sunil Kishor Pathak, Noida (IN); Vipul Jain, Ghaziabad (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 187 days.

(21) Appl. No.: 14/230,623

(22) Filed: Mar. 31, 2014

(65) Prior Publication Data

US 2015/0278251 A1 Oct. 1, 2015

(51) Int. Cl.
*G06F 17/30* (2006.01)

(52) U.S. Cl.
CPC ...... *G06F 17/30268* (2013.01); *G06F 17/3028* (2013.01)

(58) Field of Classification Search
CPC .................. G06F 17/30017; G06F 17/30011; G06F 17/30265; G06K 19/06037; H04N 1/2175

See application file for complete search history.

(56) References Cited

U.S. PATENT DOCUMENTS

| | | | |
|---|---|---|---|
| 2005/0192924 A1* | 9/2005 | Drucker | G06F 3/0483 |
| 2011/0231766 A1* | 9/2011 | Chao | G06F 3/0481 |
| | | | 715/730 |

* cited by examiner

*Primary Examiner* — Duy M Dang
(74) *Attorney, Agent, or Firm* — Keller Jolley Preece

(57) ABSTRACT

A computer implemented method and apparatus for ordering images in an image set based on social interactions and viewer preferences. The method comprises ordering the images in an image set based on social interactions with the image set and viewer preferences; and providing for display, the ordered images.

20 Claims, 4 Drawing Sheets the invention generally relate to image display and, more particularly, to a method and apparatus for ordering images in an image set based on social interactions and viewer preferences.

METHOD AND APPARATUS FOR ORDERING IMAGES IN AN IMAGE SET BASED ON SOCIAL INTERACTIONS AND VIEWER PREFERENCES

BACKGROUND OF THE INVENTION

1. Field of the Invention

Embodiments of the present invention generally relate to image display and, more particularly, to a method and apparatus for ordering images in an image set based on social interactions and viewer preferences.

2. Description of the Related Art

Image sharing is a common practice today. Often people post a significant number of images in an image repository, such as a social networking site where others may view the images. For example, a user may post a hundred or more images that were taken on a trip or at an event, and over time, many thousands of images may be posted by the user. Existing methods display the images in a number of differing ordering methods, for example: 1) ordering by date when the image was created (earliest to latest, or latest to earliest); 2) ordering by date of uploading the image to the image repository; 3) ordering the image name alphabetically, or the like. Being forced to view images in a default display order results in a poor experience for the viewer. Therefore, there is a need for a method and apparatus for ordering images in an image set based on social interactions and viewer preferences.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for ordering images in an image set based on social interactions and viewer preferences is described. The method orders images in an image set based on social interactions with the image set and viewer preferences. The method then provides the ordered images such that a viewer may view images in the image set that are of interest to the viewer ahead of images that are determined to be of less interest to the viewer.

In another embodiment, an apparatus for ordering images in an image set based on social interactions and viewer preferences is described. The apparatus includes a computer having one or more processors and further comprising an image ordering module for ordering images in an image set based on social interactions with the image set and viewer preferences, and providing for display, the ordered images.

In yet another embodiment, a computer readable medium for ordering images in an image set based on social interactions and viewer preferences is described. The computer readable medium stores computer instructions that, when executed by at least one processor causes the at least one processor to perform the method for ordering images in an image set based on social interactions and viewer preferences.

Figure 1:
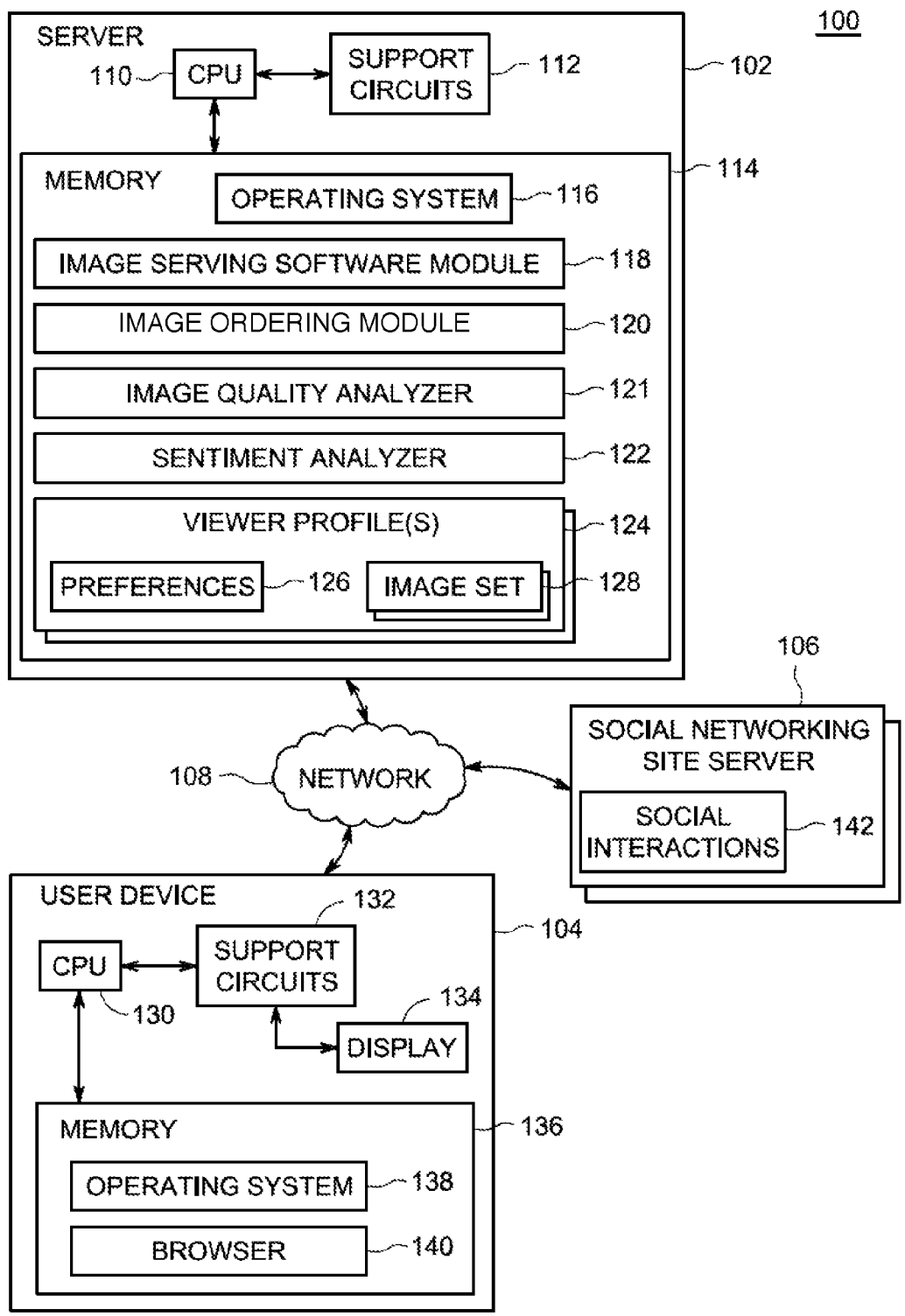
FIG. 1 is a block diagram of a system for ordering images in an image set based on social interactions and viewer preferences, according to one or more embodiments.

While the method and apparatus is described herein by way of example for several embodiments and illustrative drawings, those skilled in the art will recognize that the method and apparatus for ordering images in an image set based on social interactions and viewer preferences is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for ordering images in an image set based on social interactions and viewer preferences defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for ordering images in an image set based on social interactions and viewer preferences. The method orders images in the image set based on social interactions with the image set as well as viewer preferences. Ordering is based on a variety of criteria, including but not limited to quality of the images in the image set, an individual viewer's preference, and viewer interactions with images in the image set. When a request is received to view an image set, the images in an image set are assigned an initial point value. Images in the image set are assigned additional points based on the quality of the image, based on the viewer's preferences, and based on social interactions that previous viewers have had with each image in the image set. For example, each image of the image set is assigned points based on social interactions such as, but not limited to a number of "likes" for an image as gathered by one or more social networking site(s) or based on a semantic analysis of comments for the image of the image set, i.e., a comment of "love" has assigned points greater than a comment of "cute." The images in the image set are ordered based on a total of assigned points to each image in the image set. As such, images of greater interest to the viewer are displayed before images of lesser interest to the viewer.

In accordance with an embodiment of the present invention, techniques are provided herein that allow for determining images within an image set that are of interest to a viewer and displaying images of interest to a viewer ahead of remaining images in the image set. For example, an image set may include images from a friend's family vacation, where some of the images were taken at a soccer match. One or more people may have viewed the images on a social networking site and liked or commented on one or more of the family vacation images. The embodiments rank each image in the family vacation image set based on the technical quality of the image, a number of likes, and a determined sentiment of one or more comments. In addition, the embodiments determine a viewer's interests. For example, a viewer may have an interest in soccer. The present embodiments order the image set such that, for the viewer in the present example, the highest quality images taken at the soccer match that have the greatest number of likes and more positive comments are displayed ahead of remaining images in the family vacation image set.

Embodiments of the present invention include a method and apparatus for ordering images in an image set based on social interactions and viewer preferences. The embodiments receive a request from a viewer to view an image set in an image repository. The images in the image set are assigned points based on image quality (e.g., sharpness and lack of noise), social interactions with the image (e.g., likes and comments on the social networking site), and viewer preferences (preferences of a person viewing the image). Social interactions are based on "likes" of interactors (i.e., viewers who interact with the image on the social networking site) and interactor comments made for an image. A sentiment of an interactor comment is determined using a sentiment analyzer, which provides a sentiment value within a range, for example −100.0, to +100.0. Viewer preferences may include places (e.g., beach), interests (e.g., basketball), the subjects of an image (e.g., people in general or even specific people, pet, groups, etc.). After assigning points to each image, the image set is ordered based on the resulting point value and provided for display to a viewer. Hence, the order is changed dynamically (i.e., in real time to suit a viewer's preferences and social interaction.

An image set is presented to each viewer in an order specific to said viewer's interests.

In another embodiment, the data is collected periodically. The ordering of images is performed for different potential viewers and stored. The viewers can be grouped based on similar viewer preferences or similar social interactions (i.e., based on comments from both viewers or based on a set of parameters). The images are then displayed based on the stored order.

In yet another embodiment, a viewer is provided with viewing options. The viewer may select to view the images in normal mode, where the images are presented in an order in which the images are originally stored. A viewer may select to view the images in a pre-ordered mode, where the images are displayed according to an order based on the order of a group of viewers with similar viewer preferences or similar social interactions. A viewer may select to view the images in a dynamically changing mode, where the order is changed in real-time based on the viewer's preferences and social interaction.

Advantageously, the present invention may be a feature of an image viewing repository, such as ADOBE® REVEL™ (revel.com) or as a plug-in to any website that hosts images. Images are displayed to a viewer in an order representing the viewer's preferences. The present invention provides a viewer, who may only wish to see a few images from an image set, the images in an order where the most interesting images to the viewer are displayed first. This saves a viewer time and provides an improved viewer experience.

Various embodiments of a method and apparatus for ordering images in an image set based on social interactions and viewer preferences are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for ordering images in an image set based on social interactions and viewer preferences, according to one or more embodiments. The system 100 includes a server 102, a user device 104, and one or more social networking site servers, collectively referred to as social networking site server 106. The server 102 is a computing device, for example a desktop computer, laptop, tablet computer, and the like or the server 102 may be a cloud based server e.g., a blade server, virtual machine, and the like. The server 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, image serving software module 118, an image ordering module 120, an image quality analyzer 121, a sentiment analyzer 122 and a plurality of viewer profiles, collectively referred to as viewer profile 124. Each viewer profile 124 includes preferences 126 and may include or be associated with one or more images in the image set 128. The operating system 116 may include various commercially known operating systems.

The user device 104 is a computing device, for example a desktop computer, laptop, tablet computer, smartphone, and the like that includes or is connected to a display 134. The user device 104 includes a Central Processing Unit (CPU) 130, support circuits 132, and a memory 136. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 includes at least one of Read Only Memory (ROM), Random Access Memory (RAM), disk drive storage, optical storage, removable storage and/or the like. The memory 136 includes an operating system 138 that provides a computing foundation for software modules of the user device 104. The memory 136 includes one or more commercially available browser 140 that allow the server 102 to receive requests for images in the image set 128, and to send and display ordered images in the image set 128.

The social networking site server 106 is host to a social networking site, for example, FACEBOOK, LINKEDIN, BEHANCE, and the like. The social networking site server 106 manages social interactions 142. Social interactions 142 include any form of social engagement. In one embodiment, social interactions 142 include a number of likes for an image. In another embodiment, social interactions 142 include stored comments for an image. In yet another embodiment, social interactions 142 include both a number of likes for an image and stored comments. In some embodiments, the social interactions 142 include viewer information regarding the previous viewer who provided the social interaction 142

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like.

A viewer on the user device 104 logs into the server 102 via the browser 140. The viewer accesses the image serving software module 118 in order to access an image set 128. The image set 128 may be an image set 128 stored by the viewer or an image set 128 stored in or associated with a viewer profile 124 of a different viewer. The image serving software module 118 receives a request to view an image set 128. The image ordering module 120 accesses the image set 128. It is noted that in another embodiment, image set 128 may be stored at a location remote from server 102. The image ordering module 120 initializes a point value for each image in the image set 128. For example, the image ordering module 120 may set the initial point value to zero. The image quality analyzer 121 analyzes the image quality of each image in the image set 128. The image quality analyzer 121 may use any of one or more algorithms that assess sharpness and noise of an image and return an image quality value. Noise in an image is random variations of color information in an image produced by a scanner or digital camera. Sharpness and noise are identified using one or more algorithms, for example wavelet transform. Wavelet transform evaluates the sharpness of edges in an image in the image set and performs noise estimation to estimate noise from a single image. Based on the image quality values returned from the image quality analyzer 121, the image ordering module 120 assigns additional points to each image in the image set 128.

The image ordering module 120 then assigns additional points to each image in the image set 128 based on social interactions 142. The image ordering module 120 links to a social networking site server 106 to access the social interactions 142. The image ordering module 120 assigns additional points to images in the image set 128 based on a number of "likes" received by those images on the social networking site. In addition, the image ordering module 120 accesses comments left for images in the image set 128 and uses the sentiment analyzer 122 to determine a sentiment value for each comment. Any existing technique may be used to analyze sentiment. In one example, the returned sentiment value is determined to be a value within a pre-determined range, for example −100.0, to +100.0,, where a negative value represents a negative sentiment and a positive value represents a positive sentiment. In addition, the actual value represents the extremeness of a sentiment. For example, a comment that includes the word "love", for example, "love this photo", would have a higher actual value as it is considered strongly positive and a comment that includes the word "cute", for example, "cute pic" that is considered moderately positive. The image ordering module 120 also bases the quantity of additional points to be assigned to an image based on the social distance of the person who provided the social interaction from the viewer. For example, a positive comment provided by a friend of the viewer (on the social networking site) is assigned more points than a positive comment provided by a friend of the friend of the viewer.

The image ordering module 120 then assigns additional points based on preferences 126 of the viewer. Preferences 126 are stored when a viewer initially creates a login on the server. Preferences 126 identify what types of images a viewer would prefer to see. For example, preferences 126 may include, but are not limited to, a viewer's interests, such as locations or sports, image qualities, such as brightness or contrast, a subject of an image, such as specific people or pets. Although preferences 126 are identified at login creation, preference 126 may be updated manually at any time, and may also be updated automatically based on the social interactions 142 of the viewer on a social networking site. For example, the viewer may frequently "like" images of sporting events, or images of a specific person. Information regarding what images the viewer likes can be found in metadata of the image. Hence, such information that is identified as interests of a viewer is also stored in preferences 126.

The image ordering module 120 assigns additional points to images in the image set 128 that match the preferences 126. For each preference, the image ordering module 120 assigns additional points to an image that match the preferences 126. The image ordering module 120 orders the images in the image set 128 based on the point value assigned to each image. Images with a higher point value are determined to be of greater interest to the viewer. The image serving software module 118 displays the images in the image set 128 according to the new order. As a result, the viewer sees the image set 128 such that images of interest are displayed ahead of images that are determined to be of less interest to the viewer.

Figure 2:
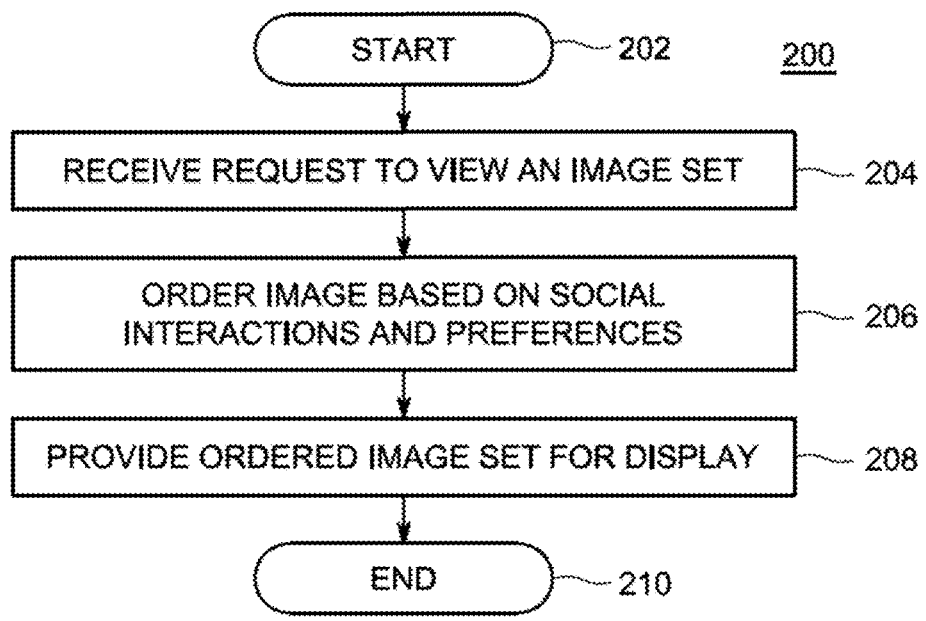
FIG. 2 depicts a flow diagram of a method for ordering images in an image set based on social interactions and viewer preferences as performed by the image ordering module of FIG. 1, according to one or more embodiments.

FIG. 2 depicts a flow diagram of a method 200 for ordering images in an image set based on social interactions and viewer preferences as performed by the image ordering module 120 of FIG. 1, according to one or more embodiments. The method 200 assigns point values to images in an image set to identify images that may be of more interest to a viewer. The method 200 starts at step 202 and proceeds to step 204.

At step 204, the method 200 receives a request to view an image set. The request may be from a viewer who is logged into an image repository or any website that hosts image sets, for example digital photo albums. The viewer may, for example, click on an image set in order to view the plurality of images in that image set.

The method 200 proceeds to step 206, where the method 200 orders the images in the image set based on social interaction and preferences of the viewer, as described in further detail with respect to FIG. 3 below.

The method 200 proceeds to step 208, where the method 200 provides the ordered image set for display to the viewer. The ordered image set is provided in an order specific to the viewer's preferences. As a result, the image set is ordered individually for each different viewer each time a viewer requests to view the image set. Additionally, due to the dynamic nature of social interactions with images in the image set, the point values for the images may be different each time even if the same viewer views the image set, resulting in a different ordering of images for subsequent views by even the same viewer. The method 200 proceeds to step 210 and ends.

Figure 3:
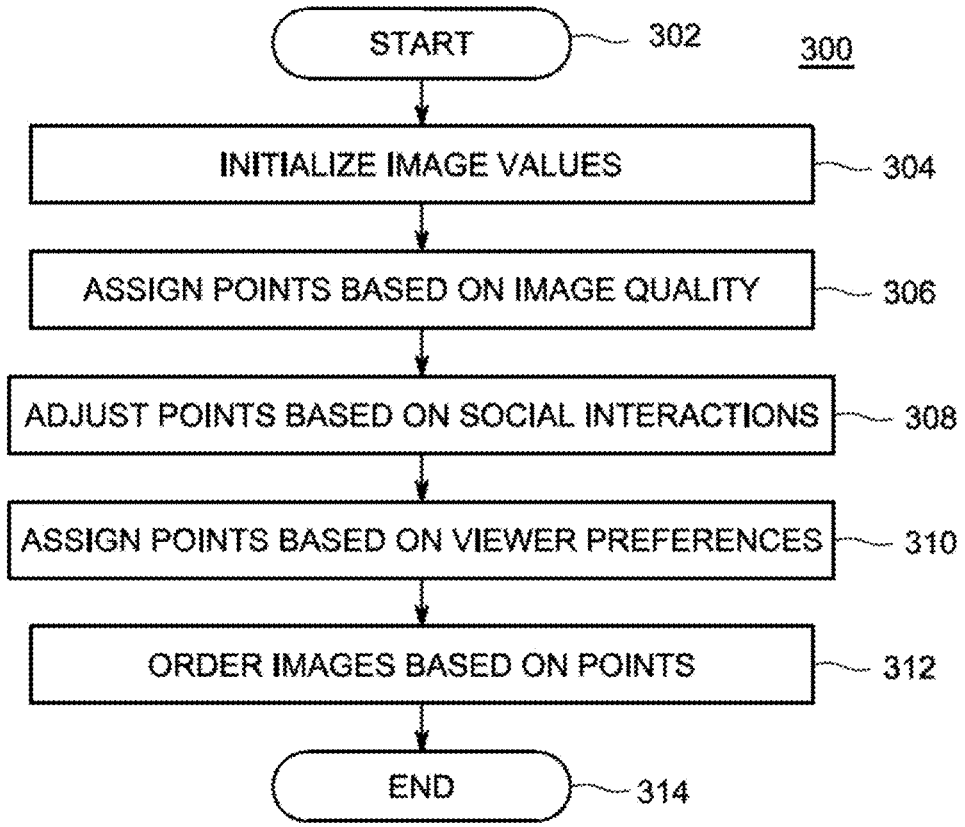
FIG. 3 depicts a flow diagram of further details of a method for ordering images in an image set as performed by the image ordering module of FIG. 1, according to one or more embodiments.

FIG. 3 depicts a flow diagram of further details of a method 300 for ordering images in an image set as performed by the image ordering module 120 of FIG. 1, according to one or more embodiments. The method 300 assigns a point value for each image in an image set, such that an image with a higher point value is expected to be of more interest to a viewer than an image with a lower point value. The method 300 starts at step 302 and proceeds to step 304.

At step 304, the method 300 initializes image point values for images in an image set. For example, the method 300 may initialize an image point value to zero for each image. Therefore, all images start with a same point value.

The method 300 proceeds to step 306, where the method 300 assigns points to images based on image quality. Some images, although they may include subject matter that is of interest to a viewer may be blurry, out-of-focus, or have other image quality issues that make the image undesirable. As such, the method 300 performs image quality analysis on each image. The method 300 performs an analysis to assess the sharpness of an image, using an algorithm, for example, Imatest, available from Imatest LLC of Boulder, Colo. The method 300 also performs an analysis to assess image noise for each image in the image set. Based on the image quality analysis, the method 300 assigns additional points to an image. For example, the method 300 may add the additional points based on the sharpness and noise values, where the number of additional points range from 0, to MaxImageQuality, where MaxImageQuality is a pre-defined maximum quality value based on the quality analysis algorithms that are used.

The method 300 proceeds to step 308, where the method 300 adjusts the point values for images that have social interactions associated with the images. If the viewer is not logged into a social networking site, the method 300 facilitates logging the viewer into the site. The method 300 then determines a number of likes for each image as well as a social distance between the viewer and the person who "liked" each image. The person who liked or commented on an image may be referred to an "interactor". The social distance between two people identifies how close of a connection there is between the two people. For example, on a social networking site, the social distance between a person who is a friend of the viewer and the viewer may be 1, because the friend is one step away from the viewer. However, the social distance between a friend of the friend of the viewer may be 2 because there are two steps from the viewer to the friend of the friend. The method 300 assigns more points for likes when the likes come from a person that is at a closer social distance than for likes that come from a person who is at a farther social distance.

The method 300 also adjusts point values for images that have comments associated with them. The method 300 accesses each comment and the social distance between the viewer and the person who made the comment. The method 300 uses a sentiment analyzer to determine the sentiment of the comment. The sentiment analyzer returns a value within a range, for example from −100.0, to +100.0,, depending on a determined positive or negative sentiment of the comments as well as a determined intensity of the comment. For example, a sentiment value of −50.0, indicates a moderately negative sentiment, while a +80.0, indicates a strongly positive sentiment. In a manner similar to the adjustment of points values associated with likes, a comment by a friend has a greater weight than a comment by a friend of the friend.

The method 300 proceeds to step 310, where the method 300 assigns points based on the viewer's preferences. As described previously, viewer preferences are stored when a viewer initially creates a login on the server. Viewer preferences identify what types of images a viewer would prefer to see. For example, viewer preferences may include, but are not limited to, a viewer's interests, such as locations or sports, image qualities, such as brightness or contrast, a subject of an image, such as specific people or pets. Although viewer preferences are typically identified at login creation, viewer preference may be updated manually at any time, and even furthermore may also be updated automatically based on the social interactions of the viewer on a social networking site. For example, the viewer may frequently "like" images of sporting events, or images of a specific person. Information regarding what images the viewer likes can be found in metadata of the image. For each viewer preference, the method 300 compares the preference with the image. If a match is found, the method 300 adds additional points to the point value for the image. For example, if an image is of a basketball game, basketball is included in metadata for the image. If the viewer has a preference for sports or basketball, the method 300 adds one or more points to the point value for the image. Similarly, if the image includes a person who is identified in the viewer's preferences, and the person is tagged in the image, the method 300 adds one or more points to the point value for the image.

The method 300 proceeds to step 312, where the method 300 orders the images so as to be in order of the point values of the images. The images that are determined to have a higher point value are identified as images that are of greater interest to the viewer than images with a lower point value. The ordered images are then available for access by the viewer in an order that is expected to be of greater interest to the viewer, thereby providing the viewer with an improved experience when viewing the images. The method 300 proceeds to step 314 and ends.

Figure 4A:
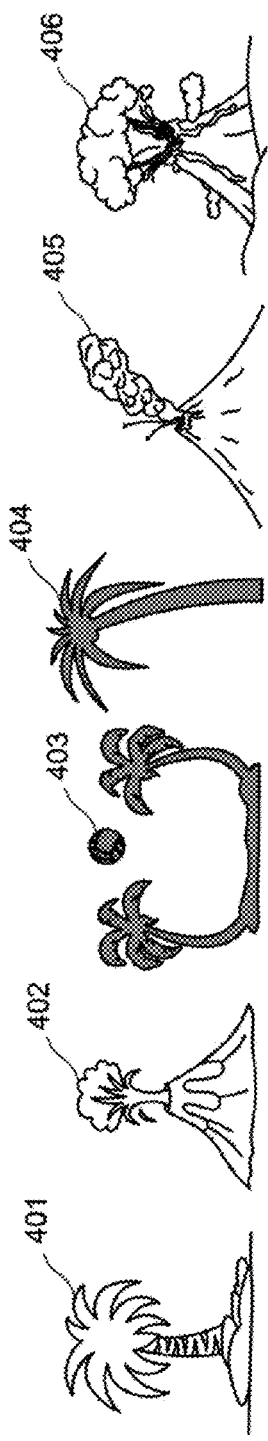
FIGS. 4A-4E collectively illustrate how images in an image set are ordered according to one or more embodiments.

FIGS. 4A-4E collectively illustrate how images in an image set are ordered according to one or more embodiments. FIG. 4A illustrates an image set having six (6) images; i.e., an image 401 of a palm tree in the daytime, an image 402 of an erupting volcano, an image 403 of multiple palm trees at night, an image 404 of a single palm tree at night, an image 405 of a smoldering volcano, and an image 406 of an erupting volcano. The image 401 of a palm tree in the daytime has two "likes" on a social networking site. The image 403 of multiple palm trees at night has one "likes" on the social networking site. The image 402 of an erupting volcano has four "likes" on the social networking site. The image 406 of an erupting volcano has two "likes" on the social networking site. When a viewer requests to view the image set, each image is assigned an initial value of, for example, zero (0).

Suppose, for example that a first viewer has a viewer preference of volcanos. Each of the volcano images 402, 405, and 406 are assigned additional points, for example, five (5) points, based on the viewer preference. Each "like" an image received on the social networking site earns the image one (1) point. As such, image 401 has two (2) points based on its two "likes". Image 402 has nine (9) points based on viewer preference plus 4, likes. Image 403 has one (1) point based on one "like". Image 404 has no points. Image 405 has five (5) points based on viewer preferences. Image 406 has seven (7) points based on viewer preferences and two likes.

Suppose, for example that a second viewer has a viewer preference of palm trees. Each of the palm tree images 401, 403, and 404 are assigned additional points, for example, five (5) points, based on the viewer preference. Each "like" an image received on the social networking site earns the image one (1) point. As such, image 401 has seven (7) points based on viewer preferences and its two "likes". Image 402 has four (4) points based on its 4, likes. Image 403 has six (6) points based on viewer preferences and one like. Image 404 has five (5) points based on viewer preference. Image 405 has no points. Image 406 has two (2) points based on its two likes.

Figure 4B:
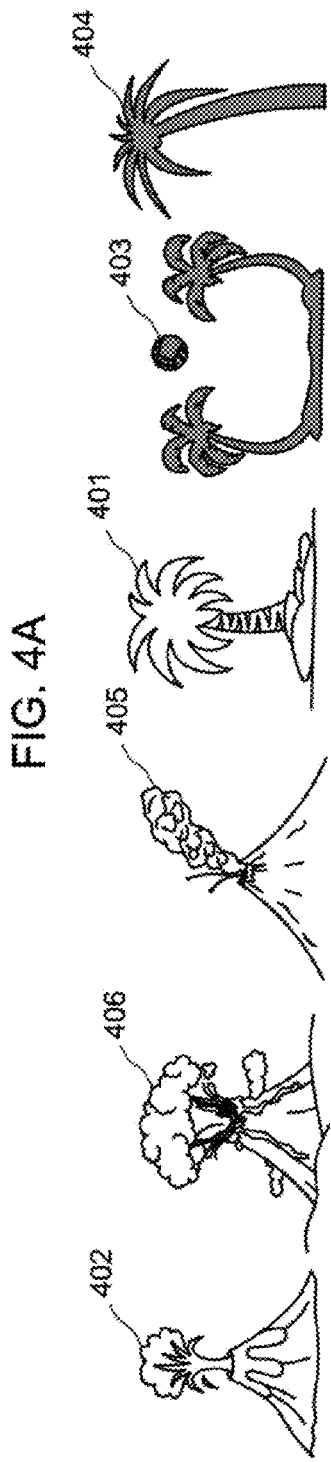

FIG. 4B illustrates the order in which the images are displayed for the first viewer with the viewer preference of volcanos. The images are displayed in order of their point values. Image 402 with 9, points is displayed first. Image 406 with 7 points is displayed second. Image 405 with 5, points is displayed third. Image 401 with 2, points is displayed fourth. Image 403 with 1, point is displayed fifth. Image 404 with no points is displayed sixth.

Figure 4C:
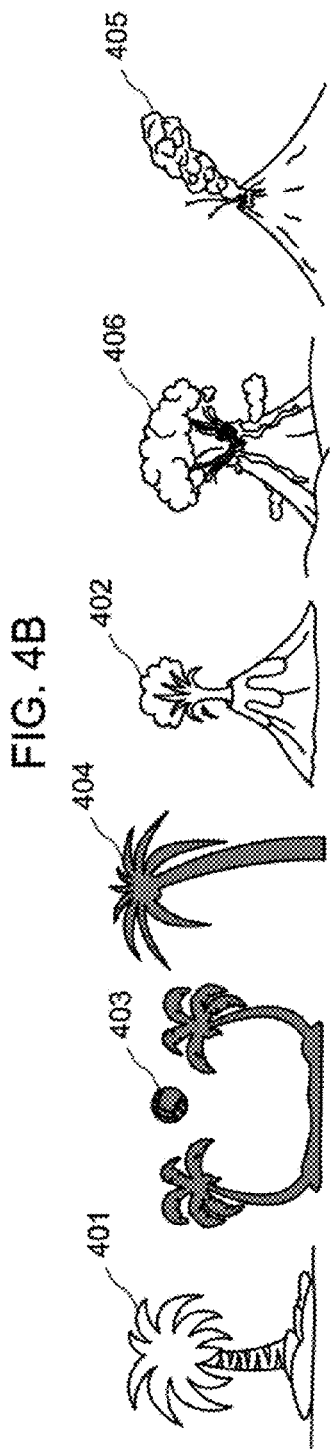

FIG. 4C illustrates the order in which the images are displayed for the second viewer with the viewer preference of palm trees. The images are displayed in order of their point values. Image 401 with 7, points is displayed first. Image 403 with 6, points is displayed second. Image 404 with 5, points is displayed third. Image 402 with 4, points is displayed fourth. Image 406 with 2, points is displayed fifth. Image 405 with no points is displayed sixth.

Figure 4D:
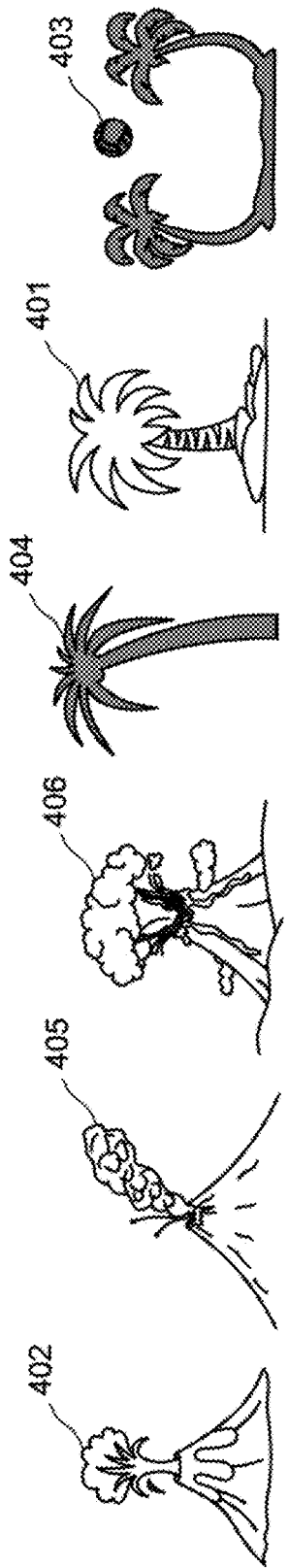

FIG. 4D illustrates the order in which the images are displayed for the first viewer after comments are received for the images. Image 404 receives a comment, "Beautiful pic". Image 405 receives a comment "Awesome!" Both comments are positive comments. Therefore, both image 404 and image 405 are assigned three (3) additional points. The comments are incorporated into the viewing as follows.

For the first viewer, each of the volcano images 402, 405, and 406 are assigned additional points, for example, five (5) points, based on the viewer preference. Each "like" an image received on the social networking site earns the image one (1) point. The positive comments earn image 404 and image 405 three (3) points each. The images are displayed for the first viewer with the viewer preference of volcanos. The images are displayed in order of their point values. Image 402 with 9, points is displayed first. Image 405 with 8, points is displayed second. Image 406 with 7, points is displayed third. Image 404 with 3, points is displayed fourth. Image 401 with 2, points is displayed fifth. Image 403 with 1, point is displayed sixth.

Figure 4E:
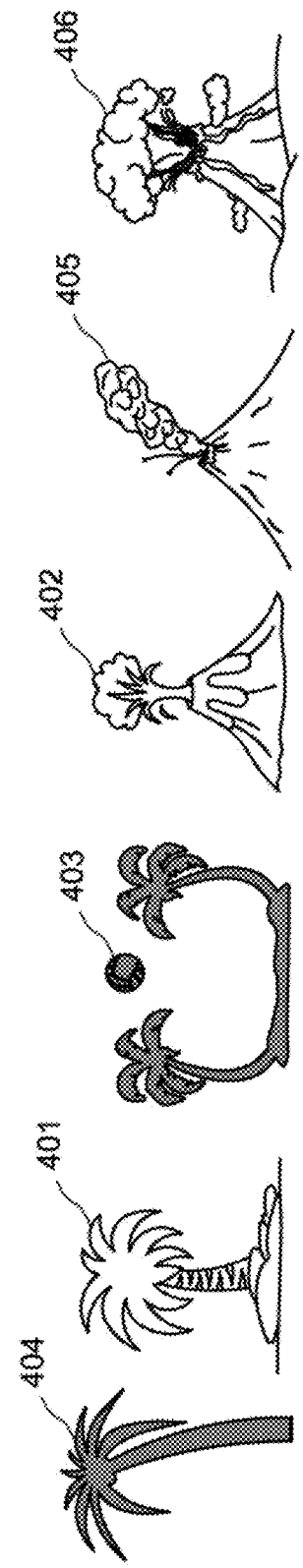

FIG. 4E illustrates the order in which the images are displayed for the second viewer after comments are received for the images. Image 404 with 8, points is displayed first. Image 401 with 7, points is displayed second. Image 403 with 6 points is displayed third. Image 402 with 4, points is displayed fourth. Image 405 with 3, points is displayed fifth. Image 406 with 2, points is displayed sixth.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
ordering images in an image set based on social interactions with the image set and viewer preferences, wherein ordering images in the image set based on social interactions comprises:
at least one of determining a number of likes for an image on the image set or performing
a semantic analysis of comments for the image; and
assigning points of the image based on the at least one of the number of likes or the semantic analysis; and
providing for display, the ordered images.

2. The method of claim 1, wherein ordering comprises:
initializing a point value for each image in the image set;
determining viewer preferences for a viewer of the image set;
assigning points to each image in the image set based on image quality of each image;
assigning points to each image in the image set based on social interactions with the image;
assigning points to each image in the image set based on viewer preferences; and
ordering the images in the image set based on a total value of points assigned to each image.

3. The method of claim 1, wherein ordering images in the image set based on social interactions comprises determining a social distance between a viewer and each person who liked image in the set, where the social distance identifies how close of a connection there is between two people within a social networking site.

4. The method of claim 1, wherein a number of assigned points based on social interaction are greater when the social interaction is made by the viewer of the image set as compared to interactions made by others.

5. The method of claim 3, wherein a number of assigned points based on social interaction is lessened as the social distance between the viewer and an interactor increases.

6. The method of claim 1, wherein viewer preferences comprise at least one of viewer interests, image subject preferences, or image quality preferences.

7. The method of claim 1, wherein viewer preferences are modified based on social interactions with images in the image set and with images outside of the image set.

8. The method of claim 1, wherein the order of images differs for different viewers.

9. The method of claim 1, wherein the order of images changes in real-time for a viewer when the viewer enters a social interaction, thereby changing a total number of assigned points for one or more images.

10. The method of claim 1, wherein the order of images changes in real-time for a viewer when a social interaction is entered by a different viewer, thereby changing a total number of assigned points for one or more images.

11. An apparatus for ordering images in an image set based on social interactions and viewer preferences comprising:
a computer having one or more processors, and:
a non-transitory computer readable medium comprising instructions that when executed by the one more processors cause the computer to perform a method comprising:
ordering images in the image set based on social interactions with the image set and viewer preferences, wherein ordering images in the image set based on social interactions comprises:
at least one of determining a number of likes for an image in the set or performing a semantic analysis of comments for the image; and
assigning points to the image based on the at least one of the number of likes or the semantic analysis; and
providing for display, the ordered images.

12. The apparatus of claim 11, wherein ordering comprises:
initializing a point value for each image in the image set;
determining viewer preferences for a viewer of the image set;
assigning points to each image in the image set based on image quality of each image;
assigning points to each image in the image set based on social interactions with the image;
assigning points to each image in the image set based on viewer preferences; and
ordering the images in the image set based on a total value of points assigned to each image.

13. The apparatus of claim 11, wherein ordering images in the image set based on social interactions comprises determining a social distance between a viewer and each person who liked an image in the image set, wherein the social distance identifies how close of a connection there is between two people within a social networking site.

14. The apparatus of claim 13, wherein a number of assigned points based on social interaction are greater when the social interaction is made by the viewer of the image set, and wherein the number of assigned points based on social interaction is lessened as the social distance between the viewer and an interactor increases.

15. The apparatus of claim 11, wherein viewer preferences comprise at least one of viewer interests, image subject preferences, or image quality preferences, and wherein viewer preferences are modified based on social interactions with images in the image set and with images outside of the image set.

16. A non-transitory computer readable medium for storing computer instructions that, when executed by at least one processor causes the at least one processor to perform a method for ordering images in an image set based on social interactions and viewer preferences comprising:
ordering images in an image set based on social interactions with the image set and viewer preferences; wherein ordering images in the image set based on social interactions comprises:

at least one of determining a number of likes for an image in the image set or performing a semantic analysis of comments for the image; and assigning points to the image on the at least one of the number of likes or the semantic analysis; and providing for display, the ordered images.

17. The computer readable medium of claim 16, wherein ordering comprises:

initializing a point value for each image in the image set;

determining viewer preferences for a viewer of the image set;

assigning points to each image in the image set based on image quality of each image;

assigning points to each image in the image set based on social interactions with the image;

assigning points to each image in the image set based on viewer preferences; and ordering the images in the image set based on a total value of points assigned to each image.

18. The computer readable medium of claim 16, wherein ordering images in the image set based on social interactions comprises determining a social distance between a viewer and each person who liked an image in the set, wherein the social distance identifies how close of a connection there is between two people within a social networking site.

19. The computer readable medium of claim 18, wherein a number of assigned points based on social interaction are greater when the social interaction is made by the viewer of the image set, and wherein the number of assigned points based on social interaction is lessened as the social distance between the viewer and an interactor increases.

20. The computer readable medium of claim 16, wherein viewer preferences comprise at least one of viewer interests, image subject preferences, or image quality preferences.

* * * * *